(12) United States Patent
Malik

(10) Patent No.: US 8,049,610 B2
(45) Date of Patent: Nov. 1, 2011

(54) VEHICLE WARNING SYSTEM

(76) Inventor: Mohd B. Malik, Old Lyme, CT (US)

( * ) Notice: Subject to any disclaimer, the term of this patent is extended or adjusted under 35 U.S.C. 154(b) by 401 days.

(21) Appl. No.: 12/146,642

(22) Filed: Jun. 26, 2008

(65) Prior Publication Data

US 2009/0322508 A1    Dec. 31, 2009

(51) Int. Cl.
*B60Q 1/52* (2006.01)
(52) U.S. Cl. .......................... 340/471; 340/479
(58) Field of Classification Search .................... 340/467
See application file for complete search history.

(56) References Cited

U.S. PATENT DOCUMENTS

| | | | | |
|---|---|---|---|---|
| 4,631,516 A | * | 12/1986 | Clinker | 340/464 |
| 5,663,707 A | * | 9/1997 | Bartilucci | 340/464 |
| 5,847,646 A | * | 12/1998 | Mucciacciaro | 340/479 |
| 6,249,219 B1 | * | 6/2001 | Perez et al. | 340/467 |
| 6,445,289 B1 | * | 9/2002 | Roberts | 340/467 |
| 6,744,359 B1 | * | 6/2004 | Wasilewski et al. | 340/467 |
| 7,468,681 B2 | * | 12/2008 | Bootes | 340/984 |
| 2006/0158323 A1 | * | 7/2006 | Pattison et al. | 340/440 |
| 2007/0205885 A1 | * | 9/2007 | Lu | 340/467 |

* cited by examiner

*Primary Examiner* — Travis Hunnings
(74) *Attorney, Agent, or Firm* — Michael L. Greenberg, Esq.; Greenberg & Lieberman, LLC

(57) ABSTRACT

An Abrupt Braking Indicator (ABI) that complements a vehicle's existing rear brake light by determining the difference between regular brake pedal usage and dangerous abrupt stops or abrupt-braking that often causes accidents. It is when, and only when, an abrupt stop or hard brake occurs at the differential gravitational value of 0.5 G or more that the present invention emits highly noticeable flashing lights that warn following drivers of the sudden hazard ahead.

19 Claims, 4 Drawing Sheets

VEHICLE WARNING SYSTEM

FIELD OF THE PRESENT INVENTION

The present invention is a vehicle warning system relating to automotive braking lights. In particular, the present invention relates to brake lights that indicate the abrupt-braking of the vehicle in which they are installed.

BACKGROUND OF THE PRESENT INVENTION

In 2002 there were 42,815 fatalities on U.S. highways, according to the U.S. Department of Transportation.[1] Given the high speeds at which drivers travel on U.S. highways, and even local roads, the difference between an accident and a close call can often be measured in split seconds. Many times, it is our conditioned reflexes that take control in emergency driving conditions. In such cases, allowing drivers a few more moments in which to react may save numerous lives and prevent needless property damage.

[1] http://safety.fhwa.dot.gov/facts/stats2002/index.htm#map1

Data from the year 2000 indicates that there are 1.5 million rear-end collisions each year, which account for approximately 2,000 fatalities and approximately 950,000 injuries[1]. Rear end collisions are most often caused by a lead driver braking, sometimes unexpectedly, and a second, following driver, not recognizing that the first driver is drastically changing their speed. Often, the second driver will fail to notice that the lead driver is making a 'panic stop,' a stop during which the full braking ability of a vehicle is utilized. The best a following driver can do is to also attempt to make a panic stop. However, if the following driver recognizes at too late of a time that the lead driver is making a panic stop or is braking hard, there is nothing they can do to prevent the collision as their car only has so much available traction to brake with. Therefore, a system is needed that can alert other drivers that a vehicle, on the road, in front of them is braking hard or making a panic stop.

Today with the use of cell phones and other electronic gadgets it has become increasingly urgent to detect abrupt driving conditions as soon as they occur so the driver can react appropriately in a timely manner.

U.S. Pat. No. 3,395,388 issued on Jul. 30, 1968, to Hendrickson is a vehicle warning system comprising several lights that are used to indicate whether a vehicle is accelerating, coasting, or braking. Unlike the present invention, Hendrickson's invention requires it to be mounted to the accelerator and brake pedals and is complex in its design. Unlike the present invention, Hendrickson's invention cannot be easily mounted to the rear window of a vehicle.

U.S. Pat. No. 3,414,879 issued on Dec. 3, 1968, to Holland is a vehicle warning system that alerts following drivers by illuminating a light once the driver of the vehicle has released the accelerator pedal. Unlike the present invention, Holland's system requires installation upon the gas and clutch pedal and cannot warn the following car of a driver slowing their car down at a higher than average rate.

U.S. Pat. No. 3,478,312 issued on Nov. 11, 1969, to Lee is a brake warning system that flashes the front and rear turn signals when the accelerator pedal is released and operates the vehicle lights in typical fashion once the brake pedal is depressed. Unlike the present invention, Lee's system requires extensive integration into the vehicles electronic and mechanical systems and does not contain a provision for warning of a fast or panic stop.

U.S. Pat. No. 3,501,742 issued on Mar. 17, 1970, to Ellison is an emergency brake warning system that illuminates flashing light bulbs in a unit mounted in the rear window of a vehicle once a certain rate of deceleration is exceeded. However, unlike the present invention, the same bulb is used to indicate the braking light as well as the fast braking indicator light. Additionally, Ellison's device has the braking light along with the right indication light, and the left indication light all in the same housing. Ellison's device also has a wire connecting to the existing brake and signal light circuit of the vehicle. Unlike the present invention, Ellison's device is relatively complex and does not have an indicator or a distinguished brake light indication. Ellison's device has a manual auxiliary switch mounted on the dashboard of the vehicle for selective manual actuation. This creates unnecessary confusion and reduces the reliability of the signal as it may encourage the drivers to misuse Ellison's device. Ellison's device has a very complicated and cumbersome construction; Ellison's device uses a casting structure housing to house all indication lights such as braking, and right and left turn signal lights, in addition to the fast braking light. Unlike the present invention, Ellison's device is not less complicated and is not simple. Ellison's device simply adds two flashing lights on to either side of the existing brake light located near the rear windshield of the vehicle. Unlike the present invention, Ellison's device does not enable there to be less confusion in an emergent situation and better communication with the following vehicle; rather it heightens the panic and may in fact increase the possibility of a collision, countering the purpose of the present invention.

U.S. Pat. No. 3,760,353 issued on Sep. 17, 1973, to Hassinger is an emergency brake warning system that mounts in the engine bay of a vehicle and activates the brake lights of the vehicle once a certain level of deceleration is exceeded. Unlike the present invention, Hassinger's invention requires complex installation and adjustment, as it must be reset after every use, and utilizes a vehicle's existing brake lights making the fast braking action undistinguishable. Unlike the present invention, Hassigner's invention cannot simply be installed on the rear window and is not adjusted from the factory.

Therefore, there is a need for a brake light supplement that is capable of simple installation, great visibility, and is at the same time based on extreme deceleration as opposed to lack of acceleration.

U.S. Pat. No. 6,225,896 B1 issued on May 1, 2001, to Sendowski is an emergency-stop warning unit that uses white Reverse-Light as an indication for high deceleration. Unlike the present invention, Sendowski's system utilizes the white Reverse Light, which would be very confusing to a normal driver. Also the visibility of white Reverse-Light is low as they are situated at lower elevation than the third break light that present invention is using. In addition the white Reverse-Light does not present a sense of urgency that is needed for fast action from following driver.

Sendowski activates at 0.2 G which is very frequent. 0.2 G can easily be achieved at normal stopping and turning of a vehicle. Hence this light will not have much value as it will be turning on more frequently and in non emergency situations. The present invention solves these issues by activating at the limit when the passenger upper body moves forward (approximately 0.5 G or above.).

Therefore, there is a need for a flashing light next to the third brake light with great visibility, and is at the same time based on extreme deceleration as opposed to 0.2 G deceleration. While there are a variety of inventions in the field as enumerated above, none of them possess the combination of structural differences required to achieve the result that the present invention does.

SUMMARY OF THE PRESENT INVENTION

The present invention is an extreme brake indicator, as opposed to an early warning brake indicator. The present invention has been designed taking into account certain circumstances that surround rear-end collisions.

First, the present invention warns the following vehicle that the preceding vehicle is decelerating at a rapid pace (0.5 G or more). The present invention assumes that the brake light will be already illuminated as a car is braking, and thus, the present invention can feeds off of the circuit that provides power to the brake light. Quite simply, there is little reason to connect the present invention to any other electrical or mechanical system of a vehicle. There is no need to fiddle with an accelerator pedal, brake pedal, or clutch. The present invention will not operate if power to the brake light is not being supplied, and the present invention can operate if power to the brake light is being supplied. Naturally, power to the brake light is supplied when the operator of the vehicle depresses the vehicle's brake pedal. Thus, the present invention can operate easily per certain circumstances in combination with power to the brake lights.

Second, rear end collisions sometimes occur not because a first vehicle is closely following a second vehicle, but because the first vehicle's driver is not alerted in a short enough time that a quick deceleration of the second vehicle is occurring. A deceleration of below 0.5 G constitutes as normal breaking, where as a value greater than or equal to 0.5 G constitutes as a deceleration which is sudden and abrupt. The driver of the first vehicle might not notice that a brake light has suddenly been depressed—especially if night conditions are involved. Many vehicles employ taillights which illuminate brighter to indicate stops, while the taillights are only somewhat illuminated during acceleration or coasting. It is difficult for some drivers to determine, being unfamiliar with the brake light intensity of a vehicle in front of them, how bright a taillight actually is and what signal it is conveying. For example, one driver might see taillights and notice that they have become bright indicating a stop, whereas another driver might see taillights and not notice a subtle shift in intensity intended to signal a stop.

To remedy this problem, most vehicles have a third brake light positioned at the eye level of a driver in a vehicle approaching from behind. However such third brake lights vary in intensity, shape, and appearance. And in nighttime conditions with many red lights turning on and off in stop-and-go traffic, a driver can easily fail to notice the illumination of a third brake light. The present invention solves the problem of a driver failing to see and, in effect, react to the third brake light. In general, the brake light that this application refers to is the third brake light—typically positioned at the line of sight of the driver following the vehicle. Though the power line that controls the taillights of the vehicle could be connected to the present invention to provide power and activation, it is preferred that the power line to the third brake light is employed because the present invention is preferably positioned adjacent to the third brake light. The third brake light is the brake light most typically noticed by a driver following a vehicle, and so the present invention is positioned in an accessible location. Thus, the present invention preferably placed near the third brake light ensures that any driver following the vehicle is alerted from a position that is most likely to be seen by drivers following the vehicle.

Third, the present invention recognizes that lights following a typical illumination pattern alone do not prevent accidents. Thus, the present invention provides lights flashing, preferably one on either side of the third brake light, to harness the driver's attention of a rapidly decelerating vehicle. The power for the flashing lights is provided by the circuit that powers the third brake light, along with a deceleration-detecting component allowing the power to pass from the third brake light to illuminate the two preferred flashing lights. Flashing ((strobe) flashing) lights are not red as are tail lights, but are provided in several colors of choice. Additionally, they are positioned adjacent to the third brake light. Unlike a school bus which typically has a strobe light flashing at all times from the roof of the bus, the present invention presents a multitude of flashing lights, preferably adjacent to the third brake light—the third brake light being the place that drivers would most likely look to determine if a vehicle is braking.

Fourth, the present invention needs to be simple to install. No one will use a device to avoid accidents if its use is predicated upon installation difficulty. The present invention cannot be universally accepted if it costs too much to purchase and/or install. Thus, the present invention is not overly complicated and does not require a lot of time to install. The present invention works off the already existing brake circuit which powers the third brake light. The present invention can be positioned right behind the headrests of a typical sedan, where there is oftentimes a shelf provided. The wiring connections for the present invention can be positioned in the trunk of the vehicle—a place which is fully accessible without necessitating the disassembly of the vehicle. The deceleration-detecting component of the present invention can either be housed adjacent to the third brake light on the typical shelf behind the headrests of a typical sedan, or in the trunk of the vehicle. As aforementioned, the trunk is easily accessible, and proves an ideal place for the deceleration-detecting member to be located.

Fifth, the present invention recognizes that adaptability to a wide variety of vehicles is the key to widespread use as well; and naturally wide spread use of a safety device preventing rear-end collisions is critical to public safety. To be used extensively, the present invention is basic in terms of design to achieve the utmost functionality, as it employs the conventional flashing lights. Further, the present invention employs any type of switch to determine a deceleration greater than or equal to 0.5 G. The present invention takes conventional flashing lights and a conventional switch, and joins them via conventional electrical connections fed off of an already existing electrical feed to the third brake light or cigarette lighter. There is no requirement for installation, but that there is some electrical connection to certain brake lights of the vehicle. Breaking causes power to be supplied to the present invention, and the conventional switch allows that power to illuminate flashing lights. Unlike many other inventions, the present invention is not specific to a class of vehicles, and for that matter, will even work on a boat, truck or bus with rear lights that illuminate if some manner of braking is applied. The present invention will even work on an airplane when some manner of braking is applied. There merely needs to be some electrical current supplied when braking occurs, to allow the conventional switch to measure deceleration of 0.5 G or more and to illuminate the flashing lights if appropriate deceleration is detected.

DETAILED DESCRIPTION OF THE PREFERRED EMBODIMENT

The present invention is an abrupt braking indicator that is designed to complement existing brake lights of a vehicle by warning drivers following behind the vehicle of an abrupt stop or other emergent-braking conditions as opposed to the mere common use of the brakes for slowing down or turning. The Abrupt-Braking Indicator (ABI) is adaptable to virtually all types of vehicles in respect to its placement and installment. Moreover, the present invention consists of a relatively simple construction, which aids in its durability and installment while maximizing its desired effect. The present invention is made of a conventional switch mechanism that activates a flashing light at or above 0.5 G and an electrical connection that can feed off of the existing connection to the vehicle's third brake light or any other power supply.

Figure 1:
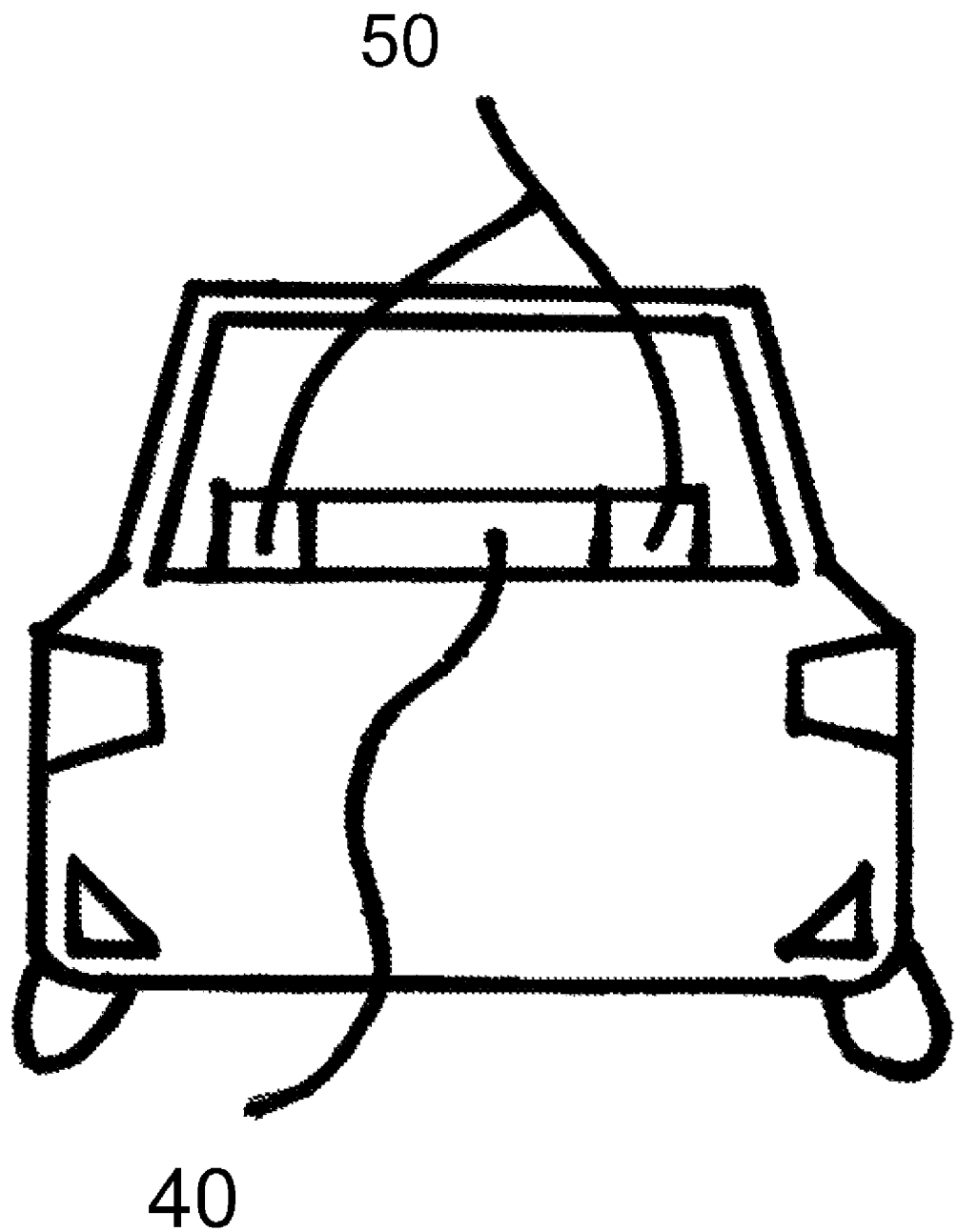
FIG. 1 shows the present invention in operation during an abrupt stop or under abrupt braking conditions.

FIG. 1 shows the two flashing strobe lights (50) lit to demonstrate their distinct brightness and color in conjunction with the existing third brake light (40). The flashing strobe lights (50) are attached to the rear end of the vehicle (10) and in the line of site of following drivers. While the third brake light (40) is activated with any depression of the standard brake pedal, the flashing strobe lights (50) are only activated when the driver abruptly depresses the standard brake pedal. When this abrupt stop or hard braking occurs at or above 0.5 G, the flashing strobe lights (50) emit their conventional and immediately noticeable flashing of color. This color is not limited.

Figure 2:
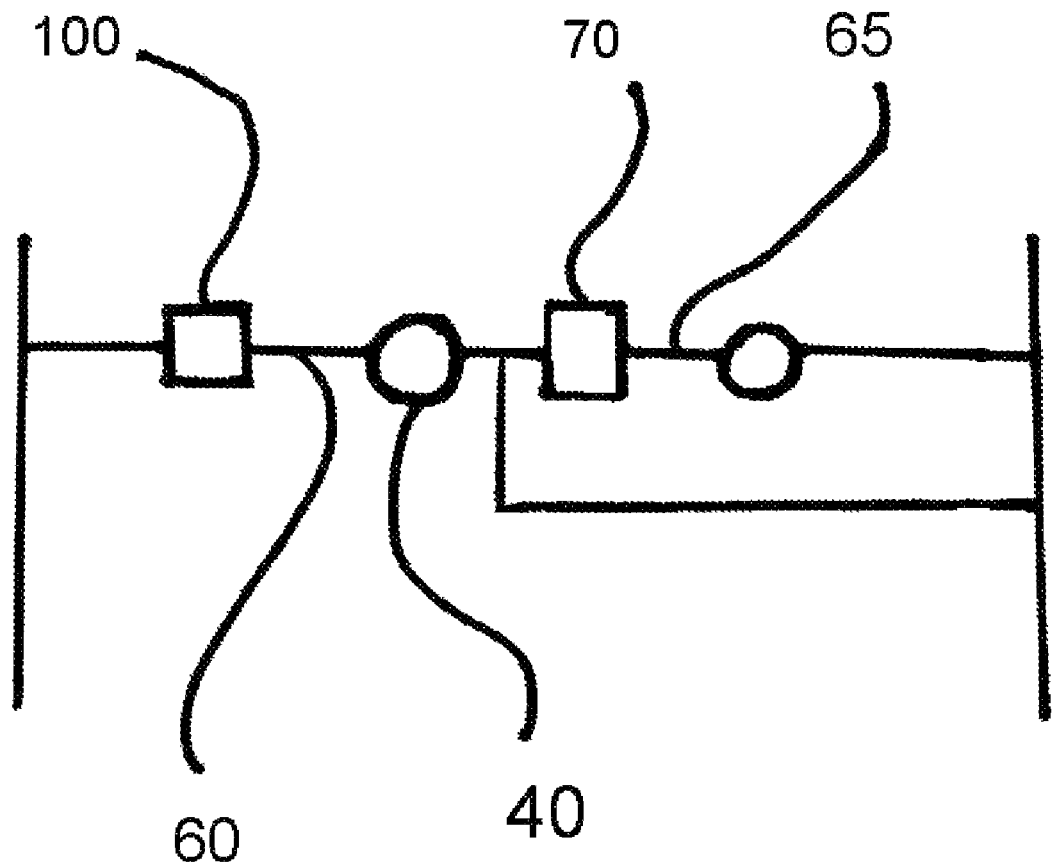
FIG. 2 shows the present invention during regular brake usage.

FIG. 2 shows a flow chart of the hard-braking indicator system. FIG. 2 shows an abruptly depressed brake system (100), that is activated pressing a conventional brake pedal, causing an electrical current to travel through existing wires (60) and into the existing third-brake light (40) to be activated. In addition, a switch mechanism (70) located in the back of the vehicle—in FIG. 2 it is located in the trunk-is connected to the existing wires (60) at its connection point (65) and feeds off the same electrical system from that point, preferably. In FIG. 2, the switch mechanism (70) detects the sudden and abrupt movement caused by the sudden depression of the brake system (100) activating another electric signal through the existing wires (60) starting at the connection point (65) and the signal travels to both the third brake light (40) and the flashing strobe lights (50).

Figure 3:
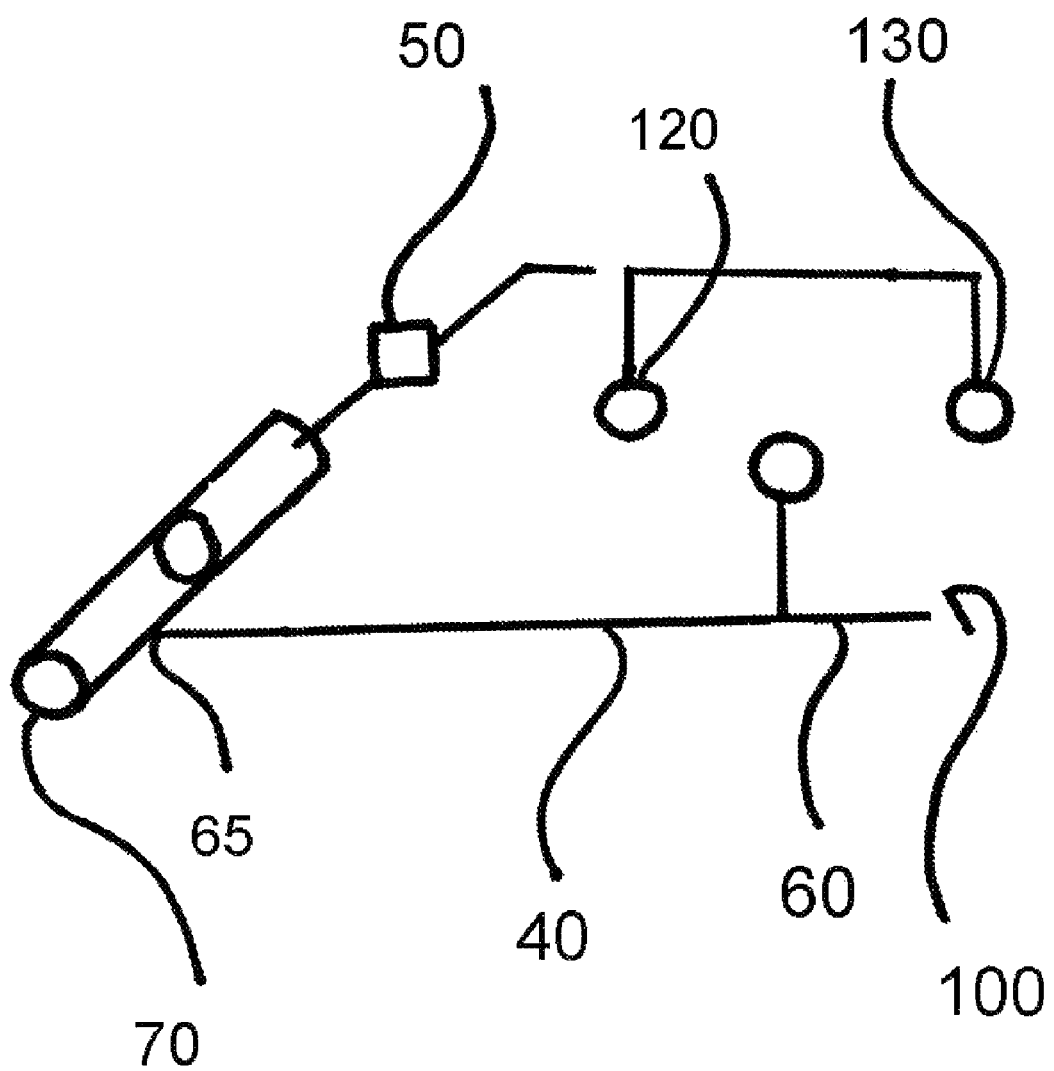
FIG. 3 shows a flow chart of the present invention in operation.

FIG. 3 shows a flow chart of the hard-braking indicator system under regular slowing and stopping conditions. Unlike FIG. 2, this chart shows a regular and non-urgent depression of brake system (100), causing an electrical current to travel through existing wires (60) and into the existing third brake light (40) to be activated. A switch mechanism (70) located in the back of the vehicle—in FIG. 3 it is located in the trunk—is connected to the wires (60) at its connection point (65) and is capable of feeding off the same electrical system from that point. However, because the brake system (100) was not depressed abruptly (deceleration of below 0.5 G), the switch mechanism (70) does not detect this sudden movement, resulting in only the original signal from the brake system (100) depression to travel and ultimately activate the third-brake light (40). In short, in this example, flashing strobe lights (50) are not illuminated, and thus will not flash.

Figure 4:
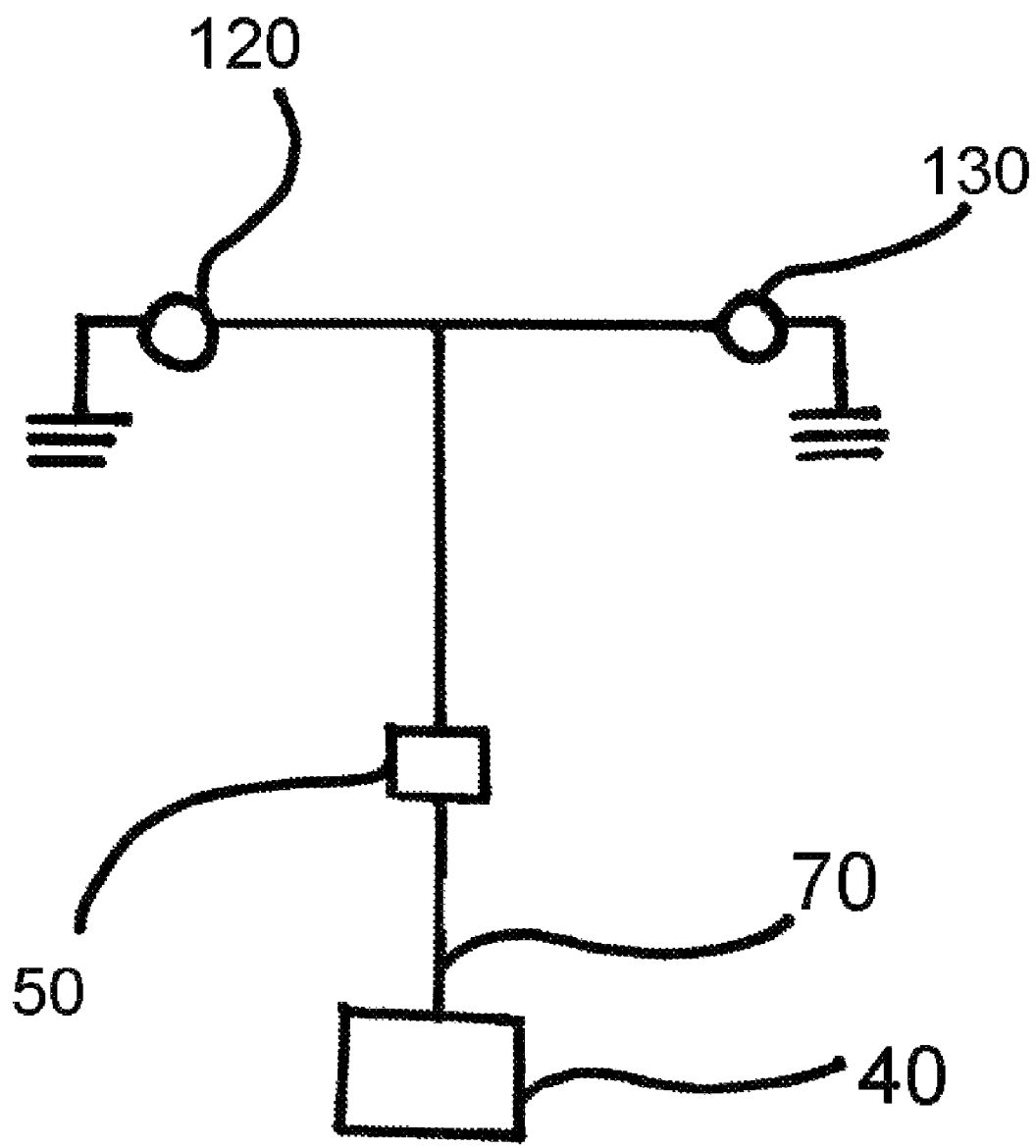
FIG. 4 shows a flow chart of the present invention during regular brake usage.

FIG. 4 shows a flow chart detailing the actual electrical connections of the present invention, when the deceleration is at or above 0.5 G. Since the power from the present invention is preferably garnered from the third brake light (40) upon activation, FIG. 4 shows the connection from the third brake light (40) to the switch mechanism (70). This connection also is shown in FIG. 4 to connect the flashing strobe lights (50) to the system. The present invention is connected and positioned so that only abrupt-braking conditions, such as those at or above 0.5 G, will close the circuit allowing the flashing strobe lights (50) to activate as intended. This prevents confusing false activations due to such issues as rough terrain or curves. FIG. 4 also provides a view of an embodiment with the left light (120) and the right light (130).

Moreover, it should be understood that in one embodiment of the present invention, a vehicle warning system is provided that works in conjunction with existing vehicle power as well as a vehicle's third brake light. This embodiment has a light, separate from the existing vehicle lights, configured to be mounted adjacent to the vehicle's third brake light; a switch, in communication with said light; a G force detector, in communication with said switch; a power source; wherein said light is configured to illuminate when said switch is activated by said G force detector; wherein said light is a strobe light; wherein said G force detector sends a signal to said switch when at least a 0.5 G force is detected; wherein said light, said switch, and said G force detector are self-contained; wherein said light is configured to draw power from the vehicle; wherein said light is in communication with the vehicle's third brake light; wherein said light is configured to illuminate when the vehicle's third brake light is activated; wherein said light is configured to illuminate only when said switch is activated by said g force detector; wherein said light is configured to draw power from the vehicle's third brake light; and wherein said light is a high intensity light. In this embodiment, switch mechanism (70) would activate when there is a 0.5 G force of deceleration or greater. It should be understood that the 0.5 G force of deceleration has been observed to be the point at which the head of a vehicle's passenger will tend to depart from a conventional head rest mounted upon a conventional passenger seat. It is such a condition that is deemed to be sudden enough braking for switch mechanism (70) to activate.

It should also be understood that a second embodiment of the present invention is a vehicle warning system that works in conjunction with existing vehicle electrical power as well as a vehicle's third brake light. This embodiment has a light, separate from the existing vehicle lights, configured to be mounted adjacent to the vehicle's third brake light; a switch, in communication with said light; a detector configured to detect a sudden decrease in speed, in communication with said switch; and wherein said light is configured to illuminate when said switch is activated by said detector. In this embodiment, switch mechanism (70) would activate when there is a sudden decrease in speed.

The present invention is not limited to the sole embodiments described above, but includes any and all embodiments of the following claims. It should be understood that any and all technology employed in this invention is that conventionally available, and in the absence of any specific reference to how any elements of the present invention are in communication, any conventional method of accomplishing such can be employed.

I claim:

1. A vehicle warning system for a vehicle, comprising:
   a light, separate from existing vehicle lights, configured to be mounted adjacent to a third brake light of the vehicle;
   a switch, in communication with said light;
   a G force detector, in communication with said switch;
   a power source, in communication with said light, said power source being the only connection to the vehicle and said power source being a feed off of a circuit that provides power to the third brake light brake light of the vehicle; and wherein said light is configured to illuminate when said switch is activated by said G force detector.

2. The vehicle warning system of claim 1, wherein said light is a strobe light.

3. The vehicle warning system of claim 2, wherein said g force detector sends a signal to said switch when at least a 0.5 G force is detected.

4. The vehicle warning system of claim 3, wherein said light is in communication with said third brake light of the vehicle.

5. The vehicle warning system of claim 3, wherein said light is configured to illuminate only when said switch is activated by said G force detector.

6. The vehicle warning system of claim 2, wherein said light is in communication with said third brake light of the vehicle.

7. The vehicle warning system of claim 2, wherein said light is configured to illuminate only when said switch is activated by said G force detector.

8. The vehicle warning system of claim 1, wherein said G force detector sends a signal to said switch when at least a 0.5 G force is detected.

9. The vehicle warning system of claim 8, wherein said light is in communication with said third brake light of the vehicle.

10. The vehicle warning system of claim 8, wherein said light is configured to illuminate only when said switch is activated by said G force detector.

11. The vehicle warning system of claim 1, wherein said light, said switch, and said G force detector are self-contained.

12. The vehicle warning system of claim 1, wherein said light is configured to not draw power from the vehicle.

13. The vehicle warning system of claim 1, wherein said light is in communication with said third brake light of the vehicle.

14. The vehicle warning system of claim 1, wherein said light is configured to illuminate when said third brake light of the vehicle is activated.

15. The vehicle warning system of claim 1, wherein said light is configured to illuminate only when said switch is activated by said G force detector.

16. The vehicle warning system of claim 1, wherein said light is configured to draw power from the vehicle.

17. The vehicle warning system of claim 1, wherein said light is configured to draw power from said third brake light of the vehicle.

18. A vehicle warning system that works in conjunction with existing vehicle lights as well as with a third brake light of a vehicle, comprising:

a light, separate from the existing vehicle lights, configured to be mounted adjacent to the vehicle's third brake light;

a switch, in communication with said light;

a G force detector, in communication with said switch;

a power source said power source being the only connection to the vehicle and said power source being a feed off of a circuit that provides power to the third brake light brake light of the vehicle;

wherein said light is configured to illuminate when said switch is activated by said G force detector;

wherein said light is a strobe light;

wherein said G force detector sends a signal to said switch when at least a 0.5 G force is detected;

wherein said light, said switch, and said G force detector are self-contained;

wherein said light is configured to draw power from the vehicle;

wherein said light is in communication with the third brake light of the vehicle;

wherein said light is configured to illuminate when the third brake light of the vehicle is activated;

wherein said light is configured to illuminate only when said switch is activated by said G force detector; and wherein said light is configured to draw power from the third brake light of the vehicle.

19. A vehicle warning system that works in conjunction with existing vehicle lights as well as with a third brake light of a vehicle, comprising:

a light, separate from the existing vehicle lights, configured to be mounted adjacent to the third brake light of the vehicle;

a power source, in communication with said light said power source being the only connection to the vehicle and said power source being a feed off of a circuit that provides power to the third brake light brake light of the vehicle;

a switch, in communication with said light;

a detector configured to detect a sudden decrease in speed, in communication with said switch; and wherein said light is configured to illuminate when said switch is activated by said detector.

* * * * *